United States Patent
Shigemura (10) Patent No.: US 7,798,523 B2
(45) Date of Patent: Sep. 21, 2010

(54) SIDE IMPACT AIRBAG APPARATUS

(75) Inventor: Takashi Shigemura, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 12/314,926

(22) Filed: Dec. 18, 2008

(65) Prior Publication Data

US 2009/0167003 A1    Jul. 2, 2009

(30) Foreign Application Priority Data

Dec. 26, 2007    (JP)    ............... 2007-334572

(51) Int. Cl.
*B60R 21/16*    (2006.01)
(52) U.S. Cl. ................................. 280/730.2
(58) Field of Classification Search .............. 280/730.1, 280/743.1, 730.2
See application file for complete search history.

(56) References Cited

U.S. PATENT DOCUMENTS

| 7,156,418 B2 * | 1/2007 | Sato et al. | ................. 280/730.2 |
| 7,350,811 B2 * | 4/2008 | Sato | ........................ 280/743.2 |

FOREIGN PATENT DOCUMENTS

JP    A-10-338099    12/1998

* cited by examiner

*Primary Examiner*—Faye M. Fleming
(74) *Attorney, Agent, or Firm*—Posz Law Group, PLC (57) ABSTRACT

The side impact airbag includes an airbag that is folded up from a state where an occupant-side wall and a vehicle-side wall having generally identical contours are lapped and flattened, through a vertical contracting step. The airbag includes at least either at the top or bottom a tucked portion that is formed in the vertical contracting step by tucking i.e. invaginating part of each of the occupant-side wall and the vehicle-sidewall inside the airbag. The tucked portion includes a main portion that is stored inside the airbag and a projecting region that extends vertically from the main portion in an exposed manner. The projecting region is folded back toward the vehicle-side wall so as to be located outside the main portion.

12 Claims, 6 Drawing Sheets

SIDE IMPACT AIRBAG APPARATUS

The present application claims priority from Japanese Patent Application No. 2007-334572 of Shigemura, filed on Dec. 26, 2007, the disclosure of which is hereby incorporated into the present application by reference.

BACKGROUND OF THE INVENTION

1. Field of the Invention

The present invention relates to a side impact airbag apparatus mounted on a vehicle seat for deployment forward between a lateral side of vehicle and an occupant.

2. Description of the Related Art

Such an airbag apparatus is known in JP 10-338099 by way of example. The airbag apparatus includes a planar airbag that is made by connecting outer peripheral edges of two generally identical panels together. The airbag is folded up into a compact configuration from a flattened state through a vertical contracting step and a horizontal contracting step. In order for the airbag to unfold quickly in a vertical direction, in the vertical contracting step, an upper region of the flattened airbag is tucked or invaginated into an interior of the airbag up to the distal end while folding up the two panels of the tucked region in layers on horizontal creases inside the airbag.

With the above way of folding the airbag, however, seams of the outer peripheral edges of the tucked region are folded up in piles with corrugations and in close contact to one another in a tight space between the two panels. In front and rear end regions of the tucked region, especially, the two panels of the tucked region overlap in a transverse direction of vehicle in multiple layers as well as the seams overlap in the transverse direction of vehicle in multiple layers and in close contact to one another, which results in bulkiness in the front and rear end regions of the folded-up airbag. Thus there is a need to reduce the folded-up configuration of the airbag.

SUMMARY OF THE INVENTION

The object of the present invention is to provide a side impact airbag apparatus wherein the airbag is folded up into a compact configuration and unfolds quickly in the vertical direction upon deployment.

The object of the invention is attained by a side impact airbag apparatus having a following structure:

The airbag apparatus is adapted to be mounted on a seat of vehicle and includes:

an inflator; and an airbag that is folded up and secured to the seat by a rear end thereof for deployment forward between a lateral side of vehicle and an occupant when fed with inflation gas from the inflator, the airbag including an occupant-side wall deployable toward the occupant and a vehicle-side wall deployable facing the vehicle, the walls having generally identical contours and being connected together by outer peripheral edges thereof to form the airbag, the airbag being folded up into a compact configuration from a state where the occupant-side wall and the vehicle-side wall are lapped and flattened, through a vertical contracting step and a horizontal contracting step, the airbag including at least either at the top or bottom a tucked portion that is formed in the vertical contracting step by tucking part of each of the occupant-side wall and the vehicle-side wall inside the airbag on a crease extending generally horizontally, the tucked portion including a main portion that is stored inside the airbag and a projecting region that extends vertically from the main portion in an exposed manner and is folded back toward the vehicle-side wall so as to be located on an outer surface of the main portion.

In the airbag apparatus of the invention, the airbag includes at least either at the top or bottom the tucked portion formed during the vertical contracting step. In the tucked portion, part of each of the occupant-side wall and vehicle-side wall is invaginated into the interior of the airbag. However, the tucked portion includes the main portion that is stored inside the airbag and the projecting region that extends vertically from the main portion in an exposed manner. In other words, out of areas of the occupant-side wall and vehicle-side wall to form the tucked portion, only a part of each of them acts as the main portion and located inside the airbag whereas a remainder of such areas acts as the projecting region and is not located between the occupant-side wall and vehicle-side wall of the interior of the airbag but is folded back toward the vehicle-side wall such that it faces the lateral side of vehicle when mounted on the vehicle. With this configuration, although the main portion is tucked in the interior of the airbag such that the occupant-side wall and the vehicle-side wall of the main portion form multiple layers, the projecting region is not located inside the airbag, and therefore, the interior of the airbag is allowed an extra space for absorbing corrugations or gathers of the walls of the main portion formed when tucked in by the space that the projecting region would otherwise have occupied. As a result, the main portion of the tucked portion is tucked in the interior of the airbag without forming irregular corrugations and, multilayered walls of the main portion are prevented from being located in a squeezing manner in the interior of the airbag. Especially, it is prevented that seams of the walls forming layers form big gathers or corrugations at the front and rear of the main portion and/or are disposed in tiers in a transverse direction of vehicle. Accordingly, the airbag of the airbag apparatus of the invention is folded up into a compact configuration especially in width, i.e. in the transverse direction of vehicle, inhibiting the peripheral seams of the airbag from lapping one on another in the transverse direction of vehicle at the front and rear of the airbag in the vertical contracting folding.

Upon deployment of the airbag of the invention, when the folds made by the vertical contracting step unfold, the projecting region firstly unfolds such that its distal end faces upward or downward, and then the airbag admits inflation gas and unfurls vertically so as to unfold the main portion. Accordingly, the airbag vertically unfolds quickly. Furthermore, since the projecting region is folded back over the vehicle-side wall of the main portion, i.e. on the side facing outward when mounted on the vehicle, the projecting region is prevented from protruding toward an occupant during deployment.

Therefore, in the airbag apparatus of the invention, the airbag is folded up into a compact configuration and unfolds quickly in the vertical direction upon deployment.

The airbag may include a member or means for controlling a clearance between the occupant-side wall and the vehicle-side wall upon airbag deployment. If such a member or means is located proximate an inward end of the tucked portion, the airbag can be folded up into a compact configuration in the same way as described above.

It is desired that a distal end region of the top and/or bottom of the airbag at full inflation forms the projecting region of the tucked portion. Such a configuration will secure more extra space in the interior of the airbag for absorbing corrugations and/or gathers of the main portion, since such a distal end region has a larger area of the bulky peripheral seam, but is not stored in the interior of the airbag and is exposed from a remainder of the airbag.

The airbag of the above airbag apparatus may be configured to protect a thorax section and a pelvis section of an occupant seated in the seat, because the above-described configuration of the invention will enable even such a big-volume airbag to be folded up into a compact configuration in width.

Moreover, if the tucked portion is formed at the bottom of the airbag, the tucked portion will unfold quickly upon airbag deployment for quick protection of the pelvis section of an occupant.

Furthermore, in such a case, if the inflator is stored inside the airbag and configured to discharge inflation gas downward toward the tucked portion, the tucked portion at the bottom of the airbag will further unfold quickly.

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Figure 1:
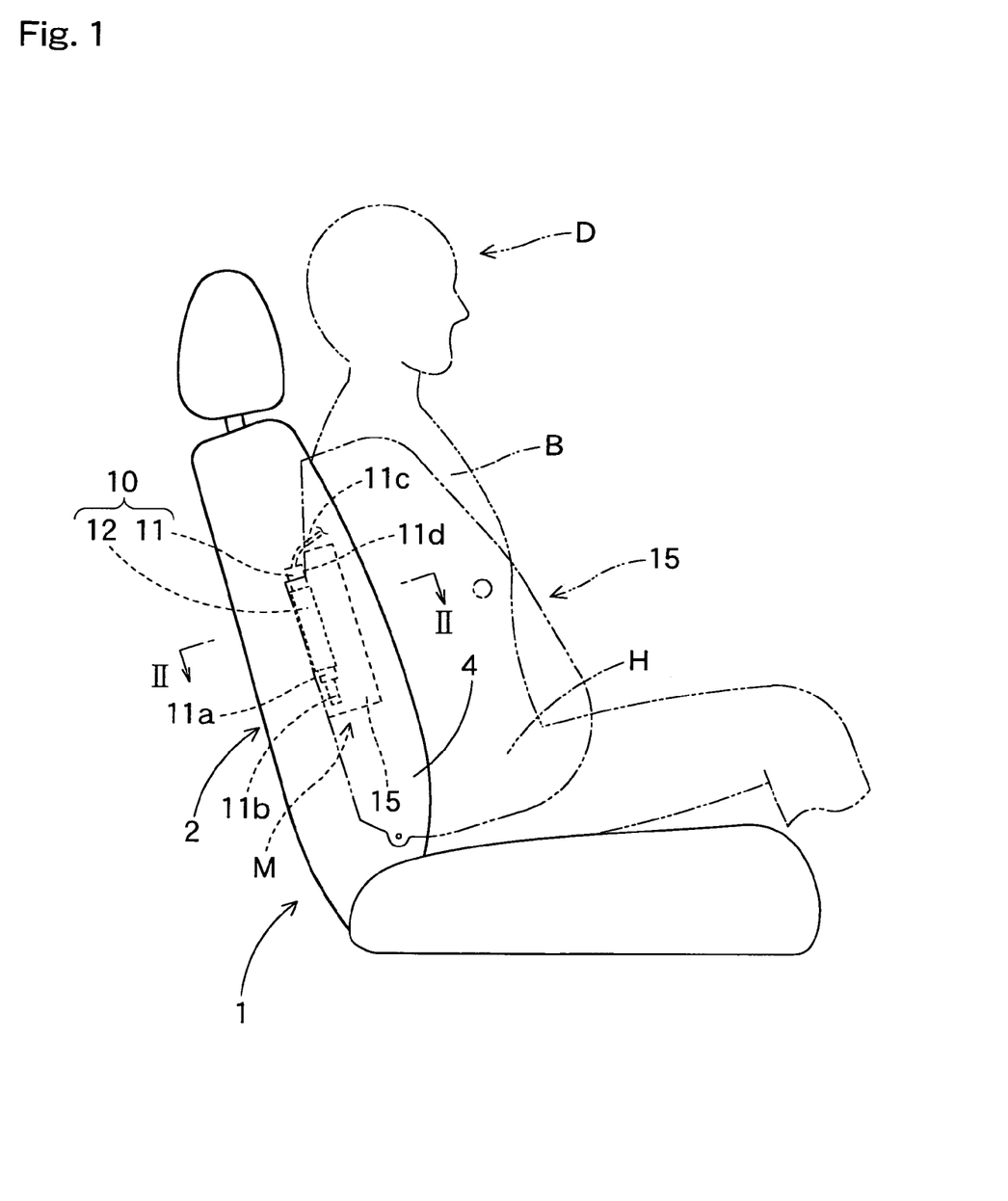
FIG. 1 is a side view of the side impact airbag apparatus embodying the invention in use.
Figure 2:
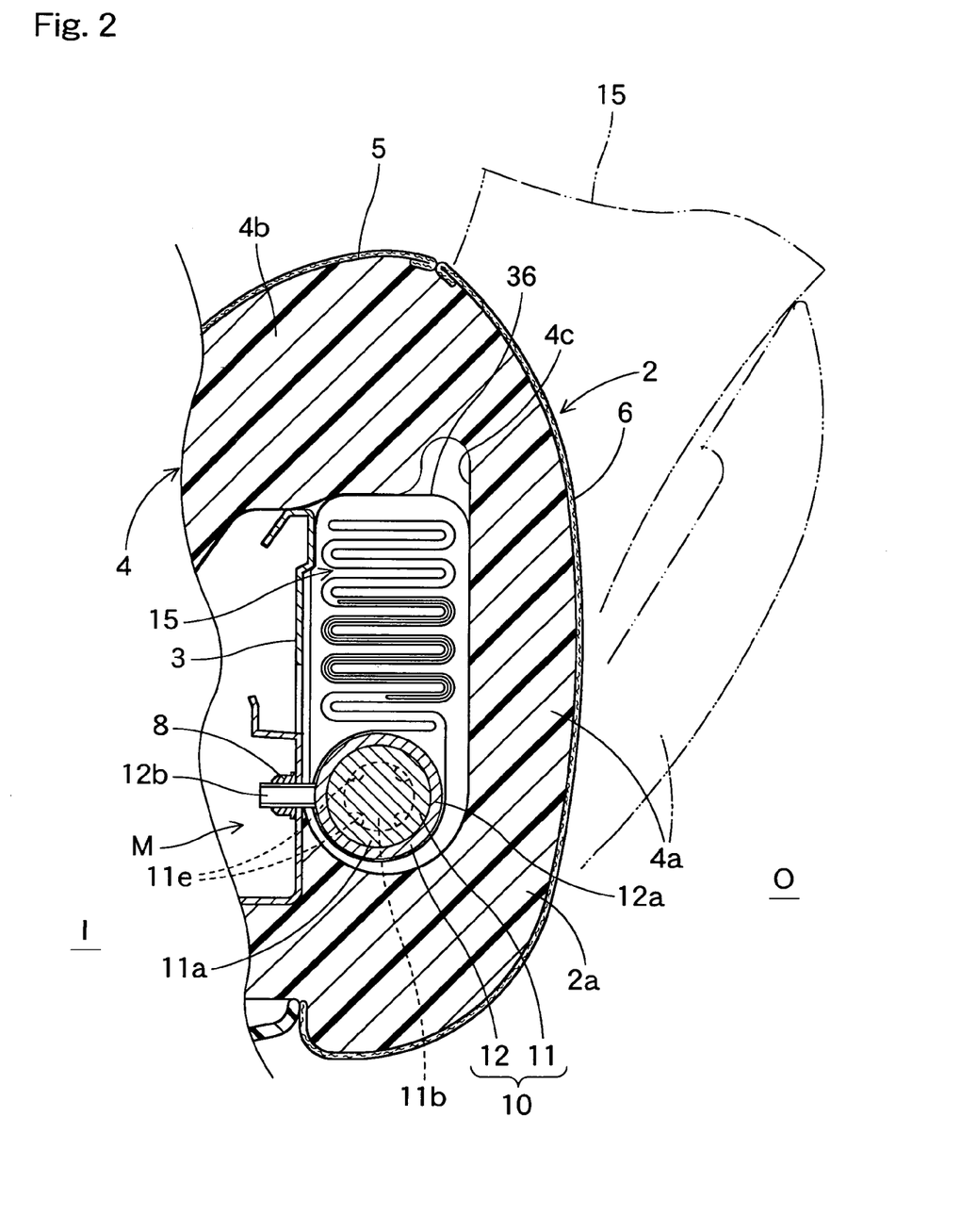
FIG. 2 is a schematic cross section of the airbag apparatus taken along line II-II of FIG. 1.

As shown in FIGS. 1 and 2, the side impact airbag apparatus M embodying the present invention is mounted on an outer lateral (on a right lateral, in the illustrated embodiment) 2a of a back portion 2 of a seat 1 of a vehicle. Unless otherwise specified, up/down, front/rear, and left/right directions in this embodiment are intended to refer to up/down, front/rear, and left/right directions of the vehicle.

The seat back 2 includes a frame 3 extending generally vertically. The airbag apparatus M is secured to the frame 3 by fastening nuts 8 with bolts 12b projecting from a mounting bracket 12 of its inflator 10. In FIG. 2, a member indicated at 4 is a cushion, and members indicated at 5 and 6 are surface skins made of decoration fabric or the like. An outer edge portion (right edge portion, in the illustrated embodiment) 4a of the cushion 4 covers the airbag apparatus M on the front and the outer side O. Upon deployment of an airbag 15, the edge portion 4a is pushed by the airbag 15 and separated from a center part 4b of the cushion 4. The cushion 4 includes a recessed area 4c that helps separate the edge portion 4a from the center part 4b thereat constantly.

The airbag apparatus M includes an airbag 15 and an inflator 10 for supplying the airbag 15 with inflation gas.

As shown in FIGS. 1 and 2, the inflator 10 includes a generally columnar body 11 and a mounting bracket 12 mounted around the body 11. In this specific embodiment, the body 11 includes a great diameter portion 11a which is columnar in shape and a small diameter portion 11b located at the bottom of the great diameter portion 11a and provided with gas discharge ports 11e. A lead wire 11c extends from a top 11d of the body 11. That is, the inflator 10 is configured to discharge inflation gas downward (i.e. toward a later-described tucked portion 27) by having the gas discharge ports 11e at the lower end region. The mounting bracket 12 includes a generally tubular holding portion 12a that holds the inflator body 11 and mounting bolts 12b projecting from the holding portion 12a. The bolts 12b are located on two positions arranged longitudinally on the holding portion 12a and extend toward the left, i.e. inward. The inflator 10 is housed inside the airbag 15 with the bolts 12b projecting from later-described mounting holes 20 of the airbag 15 and with the top 11d of the body 11 protruding from a later-described through hole 19 of the airbag 15. By fastening the bolts 12b projecting from the airbag 15 to the frame 3 of the seat 1 by the nuts 8, the inflator 10 is secured to the seat frame 3 together with the airbag 15.

Figure 3:
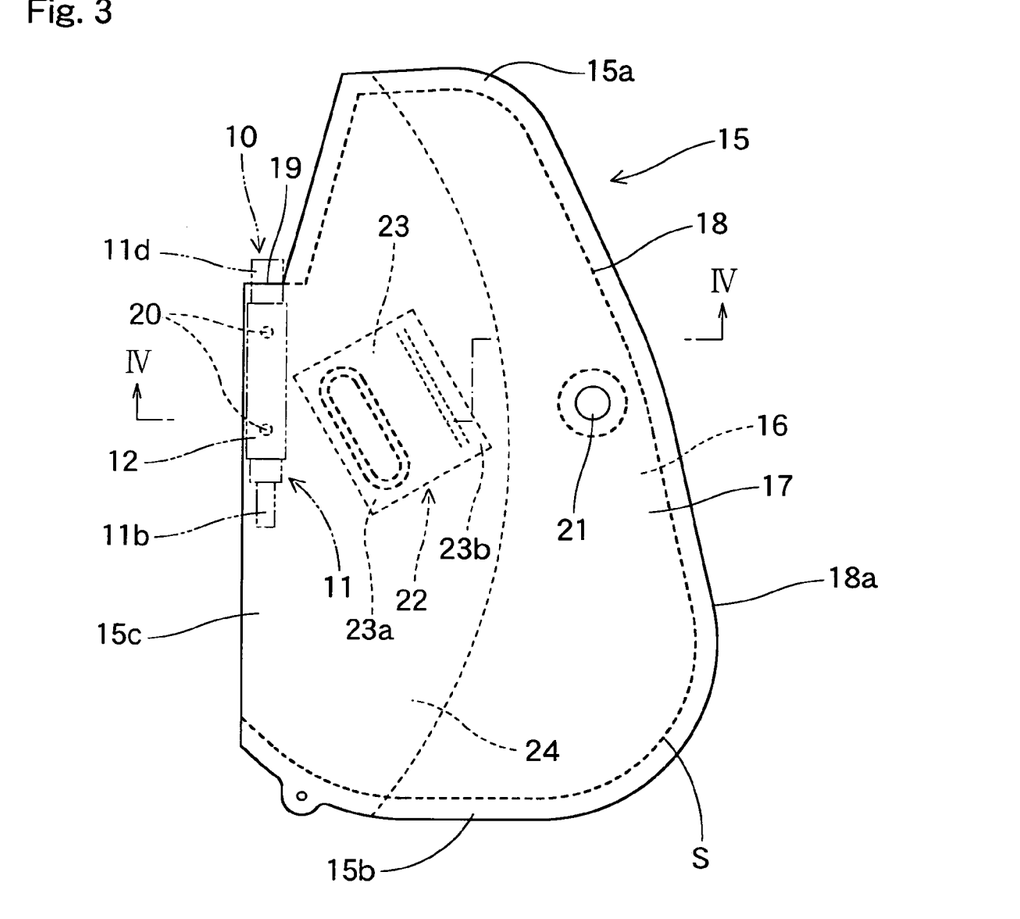
FIG. 3 is a front view of an airbag used for the airbag apparatus of FIG. 1.
Figure 4:
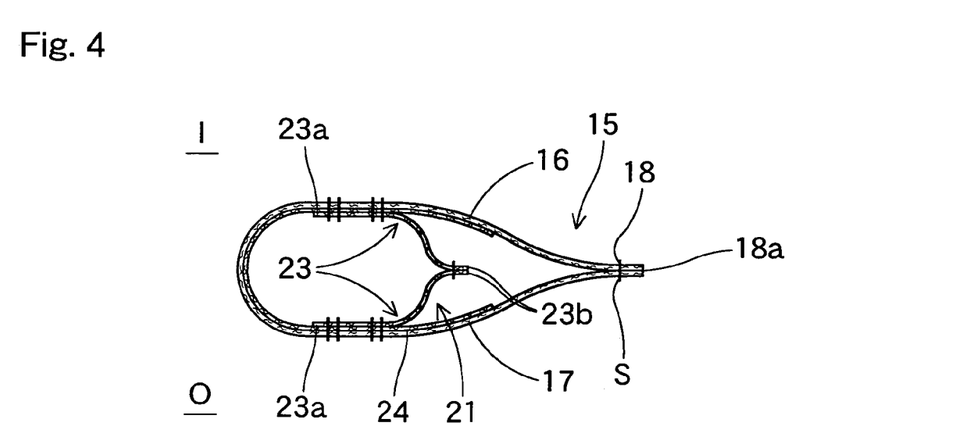
FIG. 4 is a sectional view taken along line IV-IV of FIG. 3.

As shown in FIG. 1, intended to protect a thorax section B and a pelvis section H of an occupant D seated in the seat 1, the airbag 15 is designed to inflate into a generally vertically long, trapezoidal plate shape where an upper part is narrow and a lower part is wide as shown in FIGS. 3 and 4. The inflator 10 is housed at a location 15c of the airbag 15 to be the rear end upon deployment and therefore the airbag 15 is secured to the frame 3 of the seat 1 at the rear end 15c. The airbag 15 is made of flexible fabric woven by polyester, polyamide yarns or the like and includes an occupant-side wall 16 deployable toward the occupant D (i.e. inside I) and a vehicle-side wall 17 deployable facing the vehicle (i.e. outside O). The walls 16 and 17 are generally identical in shape. The airbag 15 is a planar bag made by connecting or sewing outer peripheral edges of the walls 16 and 17 together. In this specific embodiment, the airbag 15 is made of a single piece of base cloth having such a shape that the walls 16 and 17 are continuous at regions from center to bottom of the rear ends. This base cloth is folded into two at the center and sewn up at lapped peripheral edges by sewing thread S to form the airbag 15. That is, the airbag 15 has a sewn seam (peripheral seam) 18 all around the outer peripheral edge except a lower half of the rear end 15c. In the illustrated embodiment, a seam allowance 18a is exposed outside.

Referring to FIG. 3, the airbag 15 includes at an upper region of the rear end 15c a through hole 19 from which the inflator 10 is inserted. Proximate the through hole 19 are two mounting holes 20 arranged longitudinally for receiving the mounting bolts 12b of the inflator 10. The vehicle-side wall 17 includes proximate the front end at deployment and near the vertical center a round vent 21 for exhausting an extra inflation gas.

As shown in FIGS. 3 and 4, the airbag 15 includes a tether 22 that acts as means for controlling a clearance between the walls 16 and 17 upon deployment. The tether 22 is located proximate the rear end 15c and generally at the vertical center of the airbag 15, and more particularly, in front of the inflator 10. In the illustrated embodiment, the tether 22 is made of two pieces of base cloths 23. The base cloths 23 are respectively sewn to the occupant-side wall 16 and vehicle-side wall 17 by the rear ends 23a and then sewn together at the front ends 23b, thereby forming the tether 22. In this embodiment, the base cloths 23 each has a rectangular contour and are arranged at a slant relative to a horizontal or anteroposterior direction such that the rear ends 23a face downward while the front ends 23b upward on the flattened airbag 15. Further, the airbag 15 internally includes a reinforcing cloth 24 as shown in FIGS. 3 and 4. The reinforcing cloth 24 is arranged over a generally entire vertical area in a rear side of the airbag 15.

Mounting of the airbag apparatus M on the vehicle is now described. Firstly, the inflator 10 is inserted into the airbag 15 via the through hole 19 and is located such that the bolts 12b project from the mounting holes 20 and the top 11d of the body 11 protrudes from the through hole 19. Then the airbag 15 is laid flat such that the occupant-side wall 16 and vehicle side wall 17 lap one on the other and then folded up into a compact configuration through a vertical contracting step and a horizontal contracting step. Specifically, the airbag 15 is folded up through a first vertical contracting step, a horizontal contracting step and a second vertical contracting step.

Figure 5A:
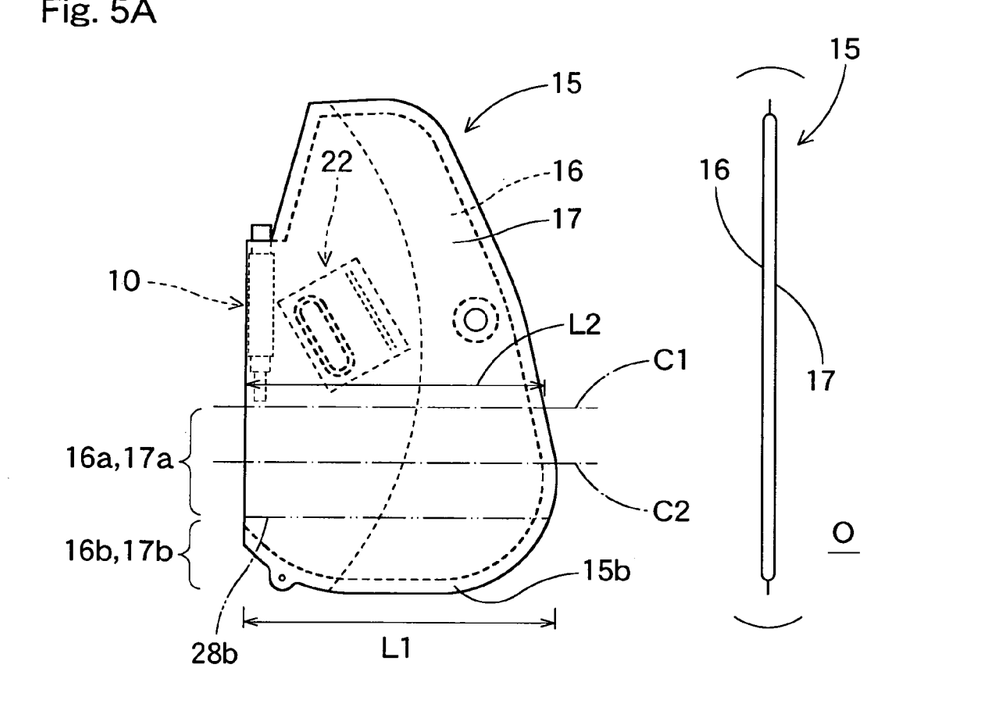
FIGS. 5A, 5B, 6A, 6B and 6C schematically illustrate the folding-up process of the airbag of FIG. 3.
Figure 5B:
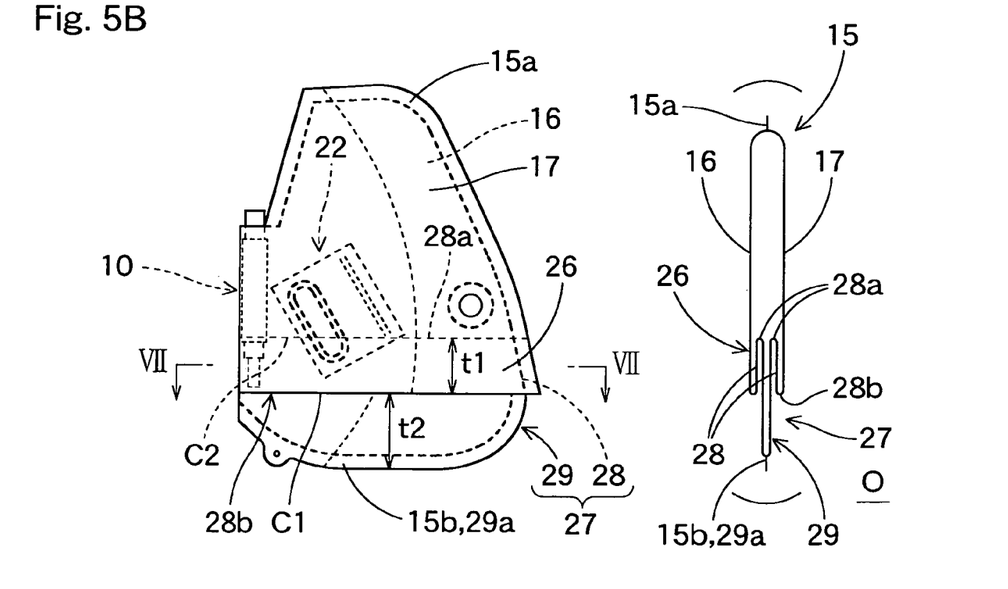
Figure 6A:
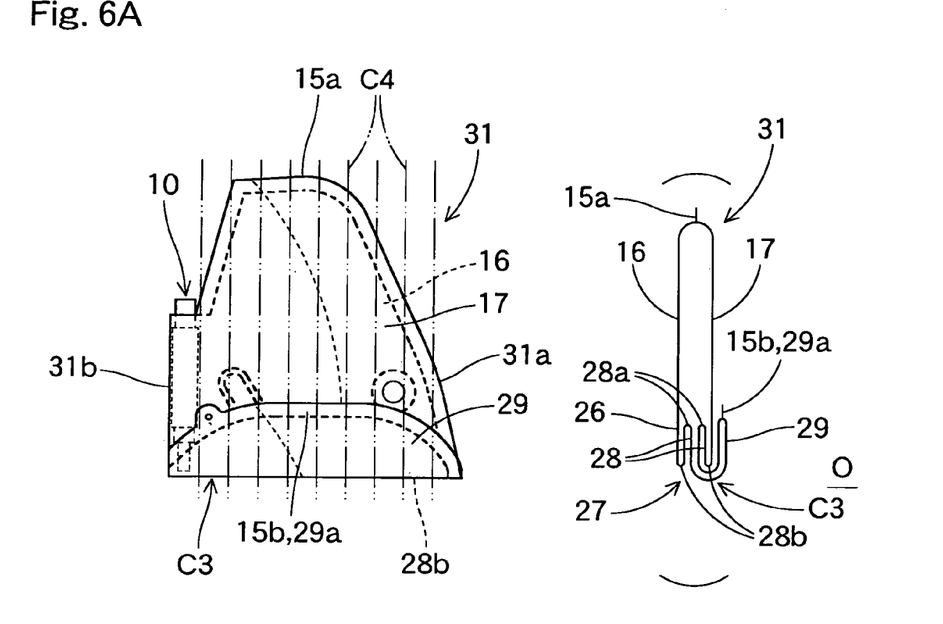

The first vertical contracting step includes tucking part of the walls 16 and 17 into the airbag 15 by making two horizontal creases C1 and C2 in the lower region as shown in FIGS. 5A and 5B such that a tucked portion 27 is provided, and folding or bending part of the tucked portion 27, i.e., a later-described projecting region 29, toward the vehicle-side wall 17 as shown in FIG. 6A, thereby reducing the vertical dimension of the airbag 15.

More specifically, the tucked portion 27 is formed by firstly folding the walls 16 and 17 inwardly on the crease C1 located proximate the bottom of the inflator 10 such that the lower region of the airbag 15 is tucked or invaginated into the airbag 15 as shown in FIG. 5B, and then folding the walls 16 and 17 again reversely on the crease C2 extending below the crease C1 such that the bottom end region 15b of the airbag 15 juts out below the crease C1. That is, as a result of folding the walls 16 and 17 on the creases C1 and C2, the tucked portion 27 includes a main portion 28 that is stored inside a region of the airbag 15 above the crease C1, namely a housing region 26, and the projecting region 29 that protrudes downward from the main portion 28 in an exposed manner. In the illustrated embodiment, the projecting region 29 is formed by the bottom end region 15b of the airbag 15. In the illustrated embodiment, furthermore, the crease C1 is located above an area of the trapezoidal airbag 15 having a greatest transverse width, and accordingly, the transverse width L1 of the main portion 28 of the tucked portion 27 in a flattened state is greater than the transverse width L2 of the housing region 26 in a flattened state as shown in FIG. 5A. The upper or inward end 28a of the main portion 28 is located proximate the tether 22. Specifically, partially located between the base cloths 23 of the tether 22, the main portion 28 is so arranged as not to engage the tether 22 substantially such that the upper end 28a is located proximate the front ends 23b of the base cloths 23 coupled together as shown in FIG. 5B. The vertical width t2 of the projecting region 29 is slightly greater than the vertical width t1 of the main portion 28 (FIG. 5B). Then as shown in FIG. 6A, the projecting region 29 is folded back toward the vehicle-side wall 17 on a crease C3 extending horizontally proximate the lower end 28b of the main portion 28 such that the end 29a or the bottom region 15b of the airbag 15 faces toward the top of the airbag.

Figure 6B:
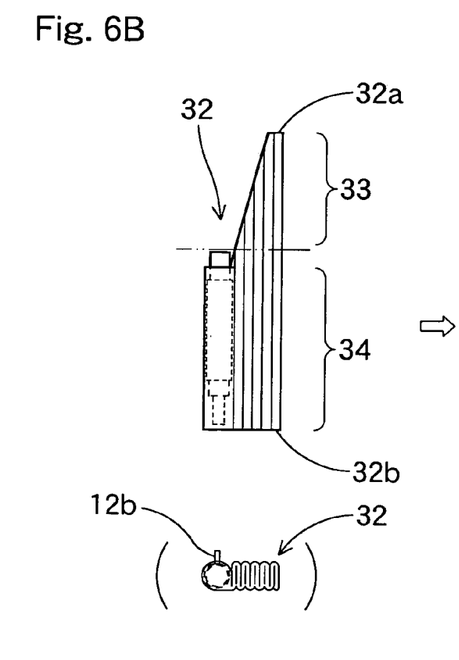

For illustrative purpose, the airbag 15 subjected to the first vertical contracting step is called a first half-folded airbag 31. The horizontal contracting step includes folding the first half-folded airbag 31 in a bellows fashion on numerous vertical creases C4 as shown in FIGS. 6A and 6B such that the front end 31a and rear end 31b draw close to each other, thereby reducing the anteroposterior dimension of the airbag 15.

Figure 6C:
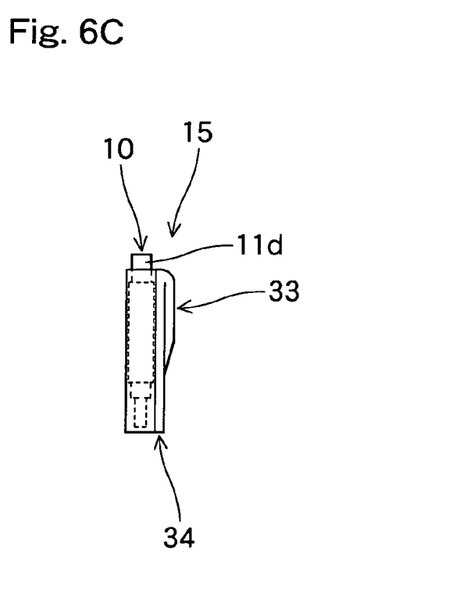

Again for illustrative purpose, the airbag 15 having gone through the horizontal contracting step is called a second half-folded airbag 32. The second vertical contracting step is then applied to the second half-folded airbag 32, where the upper region 33 of the second half-folded airbag 32 is turned down in front of the lower region 34 at a location proximate the top of the inflator 10 as shown in FIGS. 6B and 6C in such a manner as to bring the top 32a of the second half-folded airbag 32 close to the bottom 32b. Thus the folding of the airbag 15 is completed. Thereafter, the folded-up airbag 15 is wrapped by a tearable wrapping sheet 36 (FIG. 2) for keeping the folded-up configuration. At this time, the top lid of the inflator body 11 and the mounting bolts 12b are taken out of the wrapping sheet 36.

Subsequently, the mounting bolts 12b projecting from the airbag 15 are fastened to the seat frame 3 by the nuts 8, and the lead wire 11c is connected to the top 11d of the inflator body 11. Thus the airbag apparatus M is mounted on the back portion 2 of the seat 1. After mounting the airbag apparatus M, the seat 1 is furnished with the cushion 4 and surface skins 5 and 6 and then mounted on the vehicle. The lead wire 11c extending from the inflator body 11 is connected to a predetermined circuit for activating the airbag 15.

After the airbag apparatus M is mounted on the vehicle, when the inflator body 11 is fed with a predetermined signal via the lead wire 11c, the inflator body 11 discharges inflation gas from the gas discharge ports 11e formed on the small diameter portion 11b, such that the airbag 15 inflates and tears the wrapping sheet 36, pushes and separates the outer edge portion 4a of the cushion 4 from the center part 4b so it opens up, and deploys forward between the lateral side of the vehicle and the occupant D as indicated by double-dashed lines in FIGS. 1 and 2.

In the airbag apparatus M, the folded-up airbag 15 includes the tucked portion 27 at the lower region in the vertical contracting step. In the tucked portion 27, the occupant-side wall 16 and vehicle-side wall 17 are partially invaginated into the interior of the airbag 15. However, the tucked portion 27 includes the main portion 28 that is stored inside the airbag 15 (or the housing region 26) and the projecting region 29 that extends vertically from the main portion 28 in an exposed manner. In other words, referring to FIG. 5A, out of areas to form the tucked portion 27, areas 16a and 17a of the occupant-side wall 16 and vehicle-side wall 17 act as the main portion 28 and located inside the airbag 15 (or the housing region 26) whereas remaining areas 16b and 17b act as the projecting region 29 and which areas are not located between the walls 16 and 17 of the housing region 26 but is folded back toward the vehicle-side wall 17 and located outside O of the main portion 28, i.e. on a surface of the vehicle-side wall 17 of the housing region 26.

Figure 7:
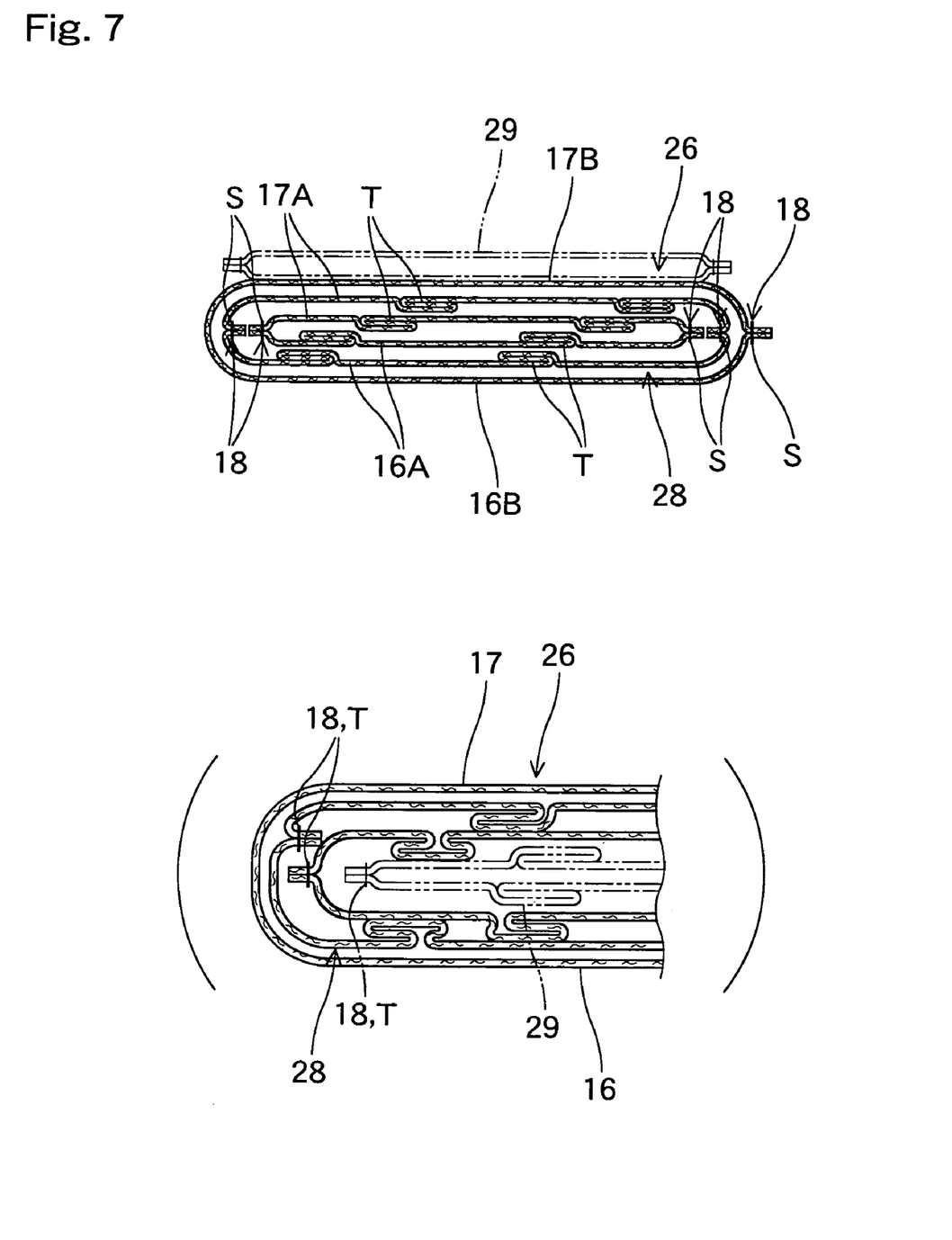
FIG. 7 is a schematic cross section of the airbag of FIG. 3 taken along line VII-VII of FIG. 5B, showing the way a tucked portion is, and also illustrates in a parenthesis a cross section of a hypothetical airbag in which a projecting region is tucked into an interior of the airbag as well, taken along the same line.

With this configuration, as shown in FIG. 7, although the main portion 28 is tucked in between the occupant-side wall 16 and the vehicle-side wall 17 of the housing region 26 such that the walls 16A and 17A of the main portion 28 form multiple layers (two layers, in the embodiment shown), the projecting region 29 is not located inside the housing region 26, and therefore, the housing region 26 is allowed in the interior a space to absorb corrugations T formed on the walls 16A and 17A of the main portion 28 by the space that the projecting region 29 would otherwise have occupied. Especially, since the transverse width L1 of the main portion 28 in a flattened state is greater than the transverse width L2 of the housing region 26 in a flattened state, the walls 16A and 17A form gathers or corrugations T when tucked in layers inside the housing region 26. Nevertheless, the extra space in the housing region 26 absorbs such gathers or corrugations T.

As a result, the main portion 28 of the tucked portion 27 is tucked in the housing region 26 without forming irregular corrugations and the two-layer walls 16A and 17A are prevented from being located in a squeezing manner inside the housing region 26. Especially, it is prevented that the sewn seams (peripheral seams) 18 of the respective layers are disposed in tiers in a transverse direction of vehicle while forming big gathers or corrugations at the front and rear of the main portion 28 (FIG. 7). If, as shown in a parenthesis of FIG. 7, the projecting region 29 is hypothetically invaginated into the main portion 28 or housing region 26 as well, the main portion 28 and the projecting region 29 will form irregular and hard-packed corrugations and the sewn seams 18 will be disposed in tiers in the transverse direction of vehicle and make the folded up configuration of the airbag 15 bulky at the front and rear ends. In the airbag apparatus M of the embodiment shown, in contrast, the sewn seams 18, which are originally bulkier due to sewing threads S than remaining areas of the walls 16 and 17, are prevented from lapping one on another in the transverse direction of vehicle in the vertical contracting process as much as possible, so that the airbag 15 is folded up into a compact configuration especially in width, i.e. in the transverse direction of vehicle.

Moreover, the configuration of the embodiment shown enables even such an airbag as the airbag 15, with a big volume intended to protect the thorax section B and pelvis section H of the occupant D, to be folded up into a compact configuration in width. Therefore, the airbag apparatus M is preferably mounted on a compact car having a limited storage space.

Upon deployment of the airbag 15, when the folds made by the first vertical contracting step unfold, the projecting region 29 firstly unfolds such that the end 29a faces downward, and then the airbag 15 admits inflation gas and unfurls vertically so as to unfold the main portion 28. Accordingly, the airbag 15 vertically unfolds quickly. Furthermore, since the projecting region 29 is folded back over the vehicle-side wall 17 of the main portion 28, i.e. on the side facing outward O when mounted on the vehicle, the projecting region 29 is prevented from protruding toward an occupant during deployment.

Therefore, in the airbag apparatus M of the embodiment, the airbag 15 is folded up into a compact configuration and unfolds quickly in the vertical direction upon deployment.

The airbag apparatus M in the foregoing embodiment has the tucked portion 27 at the lower region of the airbag 15, and therefore, the main portion 28 of the tucked portion 27 unfolds quickly upon airbag deployment for quick protection of the pelvis section H of the occupant D. However, the location of the tucked portion 27 should not be limited thereby. The tucked portion 27 may be located on the upper region of the airbag 15 or both on top and bottom of the airbag.

In the airbag apparatus M, moreover, the inflator 10 is stored inside the airbag 15 and configured to discharge inflation gas downward or toward the tucked portion 27. This configuration will help unfurl the tucked portion 27 located on the bottom region further quickly.

In the foregoing embodiment, the tucked portion 27 is formed by making two creases C1 and C2. That is, the tucked portion 27 is formed by a single tucking such that the walls 16A and 17A of the main portion 28 form two layers. However, the tucked portion may be so configured that the main portion forms more than two layers by multiple tucking, i.e. increasing the number of creases. If the tucked portion is formed by such multiple tucking, it may be configured such that a bottom end region 15b of the airbag at full inflation (i.e. prior to folding) forms the main portion whereas a vertically intermediate area of the airbag forms the projecting region. However, in comparison with an instance where the bottom end region of the pre-folding, flattened airbag forms the main portion of the tucked portion, the configuration of the foregoing embodiment where the bottom end region 15b of the airbag 15 acts as the projecting region 29 and projects from a remainder of the airbag 15 will secure more extra space in the housing region 26 for absorbing corrugations of the main portion 28, since the bottom end region 15b has a larger area of bulky seams 18 but is not stored inside the housing region 26.

The airbag 15 of the airbag apparatus M includes the tether 22 acting as a member or means for controlling a clearance between the occupant-side wall 16 and the vehicle-side wall 17 upon airbag deployment. The tether 22 controls the thickness of the airbag 15 at full inflation so as not to apply undue pressure to the occupant D. Although including such a tether 22 inside, the airbag 15 can be folded into a compact configuration since the tether 22 is located proximate the inward end of the tucked portion 27 or the upper end 28a of the main portion 28. The member or means for controlling the clearance between the walls 16 and 17 should not be limited to the tether. It will also be appreciated that the occupant-side wall and the vehicle-side wall are directly sewn together at a predetermined position to form a thickness-control portion. Moreover, such member or means is optional in the present invention.

Although the airbag 15 is formed by sewing outer peripheral edges of the occupant-side wall 16 and the vehicle-side wall 17 together with sewing thread S, means for connecting the outer peripheral edges of the walls 16 and 17 should not be limited thereby. By way of example, the walls may be connected together by adhesive or the like.

What is claimed is:

1. A side impact airbag apparatus adapted to be mounted on a seat of vehicle comprising:
    an inflator; and
    an airbag that is folded up and secured to the seat by a rear end thereof for deployment forward between a lateral side of vehicle and an occupant when fed with inflation gas from the inflator, the airbag including an occupant-side wall deployable toward the occupant and a vehicle-side wall deployable facing the vehicle, the walls having generally identical contours and being connected together by outer peripheral edges thereof to form the airbag, the airbag being folded up into a compact configuration from a state where the occupant-side wall and the vehicle-side wall are lapped and flattened, through a vertical contracting step and a horizontal contracting step, the airbag including a tucked portion that is formed in the vertical contracting step by tucking part of each of the occupant-side wall and the vehicle-side wall inside the airbag on a crease extending generally horizontally, the tucked portion including a main portion that is stored inside the airbag and a projecting region that extends vertically from the main portion in an exposed manner and is folded back toward the vehicle-side wall so as to be located on an outer surface of the main portion,
    wherein the airbag is configured to protect a thorax section and a pelvis section of the occupant seated in the seat;
    wherein the tucked portion is formed at the bottom of the airbag;
    wherein the airbag is constructed to inflate into a generally vertically long, trapezoidal plate shape, in which an upper part of the airbag is relatively short and a lower part of the airbag is relatively long, in a front-to-back direction of the vehicle, and such that, when inflated, a front end of the airbag is inclined so that the lower part is longer than the upper part, in the front-to-back direction of the vehicle; and wherein the crease, which separates the tucked portion from the remainder of the airbag is located above an area of the airbag that has a maximum length in the front-to-back direction of the vehicle.

2. The airbag apparatus of claim 1 wherein the airbag further includes proximate an inward end of the tucked portion a member for controlling a clearance between the occupant-side wall and the vehicle-side wall upon airbag deployment.

3. The airbag apparatus of claim 1 wherein the inflator is stored inside the airbag and configured to discharge the inflation gas downward toward the tucked portion.

4. The airbag apparatus of claim 1 wherein a distal end region of the bottom of the airbag at full inflation forms the projecting region of the tucked portion.

5. The airbag apparatus of claim 4 wherein the airbag further includes, proximate to an inward end of the tucked portion, a member for controlling a clearance between the occupant-side wall and the vehicle-side wall upon airbag deployment.

6. The airbag apparatus of claim 5 wherein the inflator is stored inside the airbag and configured to discharge the inflation gas downward toward the tucked portion.

7. The airbag apparatus of claim 1 wherein
the vertical contracting step is a first vertical contracting step, and the airbag is folded in the horizontal contracting step after the first vertical contracting step; and
after the horizontal contracting step, the airbag is folded in a second vertical contracting step.

8. The airbag apparatus of claim 7, wherein in the first vertical contracting step, the tucked portion is formed at the bottom of the airbag, and the project region is folded back toward the vehicle-side wall.

9. The airbag apparatus of claim 8, wherein in the second vertical contracting step, the upper region of the airbag, which has been folded horizontally in the horizontal contracting step, is folded downward.

10. The airbag apparatus of claim 3 wherein
the vertical contracting step is a first vertical contracting step, and the airbag is folded in the horizontal contracting step after the first vertical contracting step; and
after the horizontal contracting step, the airbag is folded in a second vertical contracting step.

11. The airbag apparatus of claim 10, wherein in the first vertical contracting step, the tucked portion is formed at the bottom of the airbag, and the project region is folded back toward the vehicle-side wall.

12. The airbag apparatus of claim 11, wherein in the second vertical contracting step, the upper region of the airbag, which has been folded horizontally in the horizontal contracting step, is folded downward.

* * * * *